United States Patent
Allen, II et al.

(10) Patent No.: US 8,110,105 B2
(45) Date of Patent: Feb. 7, 2012

(54) STORMWATER FILTRATION SYSTEMS

(75) Inventors: Vaikko P. Allen, II, Oxnard, CA (US);
Jeremiah M. Lehman, Vancouver, WA (US); James H. Lenhart, Jr., Portland, OR (US); Hong Lin, Elk Grove, CA (US); Daniel P. Cobb, Gray, ME (US); Gregory W. Byrne, West Linn, OR (US)

(73) Assignee: Contech Stormwater Solutions, Inc., West Chester, OH (US)

(*) Notice: Subject to any disclaimer, the term of this patent is extended or adjusted under 35 U.S.C. 154(b) by 284 days.

(21) Appl. No.: 12/420,486

(22) Filed: Apr. 8, 2009

(65) Prior Publication Data

US 2009/0255868 A1 Oct. 15, 2009

Related U.S. Application Data

(60) Provisional application No. 61/043,612, filed on Apr. 9, 2008, provisional application No. 61/056,236, filed on May 27, 2008, provisional application No. 61/140,276, filed on Dec. 23, 2008.

(51) Int. Cl.
*C02F 3/32* (2006.01)
(52) U.S. Cl. .......... 210/602; 210/617; 210/170.03; 210/259
(58) Field of Classification Search .......... 210/602, 210/615, 616, 617, 170.03, 252, 259, 294
See application file for complete search history.

(56) References Cited

U.S. PATENT DOCUMENTS

| | | | |
|---|---|---|---|
| 681,884 A | 9/1901 | Monjeau | |
| 3,770,623 A | 11/1973 | Seidel | |
| 4,221,749 A * | 9/1980 | Dedolph | 264/45.3 |
| 4,839,051 A | 6/1989 | Higa | |
| 4,855,040 A * | 8/1989 | Kickuth | 210/109 |
| 5,073,257 A | 12/1991 | Higa | |
| 5,273,653 A | 12/1993 | Kickuth | |
| 5,322,629 A | 6/1994 | Stewart | |
| 5,437,786 A | 8/1995 | Horsley et al. | |
| 5,549,817 A | 8/1996 | Horsley et al. | |
| 5,624,576 A | 4/1997 | Lenhart et al. | |
| 5,637,218 A | 6/1997 | Kickuth | |
| 5,702,593 A | 12/1997 | Horsley et al. | |
| 5,744,048 A | 4/1998 | Stetler | |
| 5,770,057 A | 6/1998 | Filion | |
| 6,277,274 B1 | 8/2001 | Coffman | |
| 6,467,994 B1 | 10/2002 | Ankeny et al. | |
| 6,569,321 B2 | 5/2003 | Coffman | |
| 6,592,761 B2 | 7/2003 | Wofford | |
| 6,652,743 B2 | 11/2003 | Wallace et al. | |

(Continued)

FOREIGN PATENT DOCUMENTS

WO WO 2010/118110 10/2010

*Primary Examiner* — Fred Prince
(74) *Attorney, Agent, or Firm* — Thompson Hine LLP

(57) ABSTRACT

A stormwater filtration system suitable for treatment of stormwater runoff in a developed environment uses a primary treatment bay that includes a filtration bed with live plant matter. A second treatment bay treats water that exceeds the maximum throughput of the primary bay. A reservoir stores treated runoff to water the plants during dry weather. Removable trays on the surface of the primary filtration bed provide plants suitable for ground cover. Additional bays expand the filtration bed throughput and accommodate extended root systems. A flow control may be provided for the primary treatment bay.

50 Claims, 8 Drawing Sheets

U.S. PATENT DOCUMENTS

| | | |
|---|---|---|
| 7,005,060 B2 | 2/2006 | Pitt et al. |
| 7,025,887 B1 * | 4/2006 | Kirts et al. .................... 210/681 |
| 7,029,201 B1 | 4/2006 | McCormick et al. |
| 7,080,480 B2 | 7/2006 | Urban et al. |
| 7,160,465 B2 * | 1/2007 | Kirts et al. .................... 210/681 |
| 7,186,333 B2 | 3/2007 | Kluge |
| 7,214,311 B2 | 5/2007 | Aberle et al. |
| 7,425,262 B1 | 9/2008 | Kent |
| 7,470,362 B2 | 12/2008 | Kent |
| 7,625,485 B2 | 12/2009 | Siviter et al. |
| 7,674,378 B2 | 3/2010 | Kent |
| 7,833,412 B2 | 11/2010 | Holtz |
| 2005/0199537 A1 | 9/2005 | Kluge |
| 2008/0142438 A1 | 6/2008 | Kent |
| 2008/0251448 A1 * | 10/2008 | Kent ............................ 210/602 |
| 2009/0045145 A1 | 2/2009 | Kent |
| 2010/0059437 A1 * | 3/2010 | Wanielista et al. ........... 210/605 |
| 2011/0147303 A1 | 6/2011 | Allard |
| 2011/0186492 A1 | 8/2011 | Holtz |

* cited by examiner

STORMWATER FILTRATION SYSTEMS

CROSS-REFERENCES

This application claims the benefit of U.S. Provisional Application Ser. Nos. 61/043,612, filed Apr. 9, 2008, 61/056,236 filed May 27, 2008 and 61/140,276 filed Dec. 23, 2008, each of which is incorporated herein by reference.

TECHNICAL FIELD

This application relates generally to stormwater filtration systems and, more particularly, to systems incorporating live plant material into the filtration process.

BACKGROUND

Stormwater can be a form of diffuse or non-point source pollution. It can entrain pollutants, such as garbage, sediment, organic matter, heavy metals, and organic toxins, and flush them into receiving water bodies. As a consequence, natural bodies of water that receive stormwater may also receive pollutants.

In an effort to address the environmental problems posed by polluted stormwater, traps and filters for stormwater have been developed.

Stormwater filtration cartridges, such as those described in U.S. Pat. Nos. 5,707,527, 6,027,639, 6,649,048, and 7,214,311, pull stormwater through a filtration bed that removes pollutants prior to discharge into a receiving water body. Improvements to such cartridges have produced highly effective filters that allow for significant throughput, as described in the references cited above, while also allowing for easy installation and replacement of the modular cartridge units.

Another known method of stormwater filtration involves the installation of horizontally-disposed filtration beds using a mixture of materials often including organic compost. Stormwater runoff directed into these beds is filtered in an action not unlike natural soil. Live plant material is sometimes added to take advantage of its pollutant uptake as well as for aesthetic value. While mixtures for these filtration beds can be developed that accommodate a higher throughput of stormwater than natural soil, the level of throughput is still limited by the area of the bed and nature of the filtration bed material. Additionally, in areas where rainfall is sporadic, the stormwater received may not be sufficient to maintain the live plant matter therein.

It would be desirable to develop a contained, aesthetic stormwater treatment system using a filtration bed including live plants that nonetheless allows for higher throughput when necessary and adequate filtration of that higher throughput to the extent practical.

It would also be desirable to develop a stormwater treatment system that can maintain the live plants therein during periods of low rainfall without excessive irrigation needs.

Additional desired improvements to stormwater treatment systems with live plant matter include methods to easily place and later remove plant matter suitable for ground cover, and supplemental beds that expand the area of treatment and can accommodate the extended root systems of the live plants found in the filtration bed.

SUMMARY

A stormwater filtration system is provided that includes a first or primary treatment bay with live plant matter in a filtration bed, and a second overflow or secondary treatment bay that receives and treats stormwater that exceeds the capacity of the first treatment bay.

In a further aspect, the first or primary treatment bay and overflow or secondary treatment bay are enclosed in a common vault structure, which includes an inlet for stormwater to enter the vault and first treatment bay, means for untreated overflow stormwater to enter the overflow treatment bay from the first treatment bay, and an outlet for treated water to leave the vault.

In another aspect, a outlet bay is provided in combination with the first treatment bay and second treatment bay, and water entering the system is directed into an inlet compartment in an upper portion of the outlet bay before entering the first treatment bay or secondary treatment bay.

In another aspect, a removable root tray containing small plants suitable for ground cover is provided which interfaces favorably with a filtration bed including live plant matter.

In yet a further aspect, a stormwater filtration system is provided that includes both a first vault including a filtration bed with live plant matter and also secondary vaults, which vaults may be configured to accommodate the extended root structure of the plants of the first vault.

An optional feature would be to incorporate a wetwell that collects treated water that can later be wicked to root zone(s) during dry periods.

The details of one or more embodiments are set forth in the accompanying drawings and the description below. Other features, objects, and advantages will be apparent from the description and drawings, and from the claims.

DETAILED DESCRIPTION

Figure 1A:
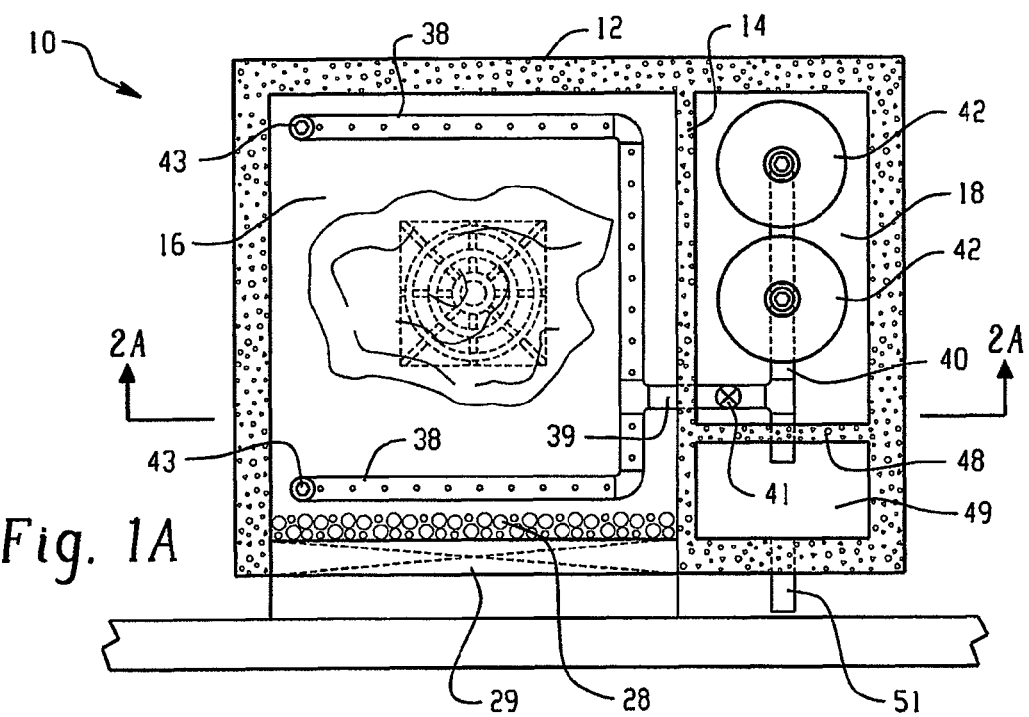
FIG. 1A shows one embodiment of a treatment system from above.
Figure 2A:
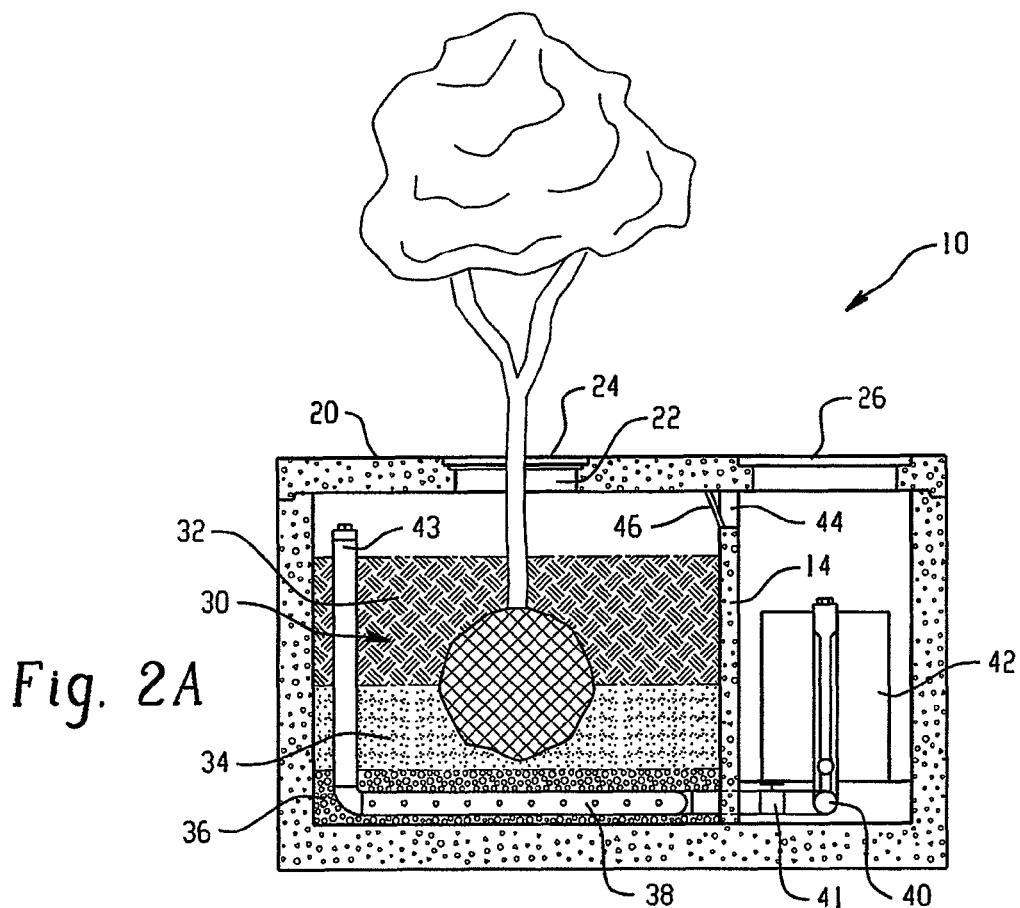
FIG. 2A is a side elevation view of the system of FIG. 1A.

In one aspect shown in FIGS. 1A and 2A, a filtration system 10 is provided in a concrete vault 12 that has an internal vertical wall 14 dividing the vault into a primary treatment bay 16 and an overflow or secondary treatment bay 18. A top wall 20 of the unit is also formed of concrete. Other materials could be used to form the vault, and the two bays could be formed as separate structures or vaults placed side-by-side and connected by corresponding adjacent wall openings and/or piping.

The primary treatment bay side of the top wall includes an opening 22 and associated tree ring 24 through which the trunk or stem of a tree or herbacious plant extends. A manhole or hatch 26 above the overflow treatment bay gives access to the filtration means located therein. Dimensions for the vault could vary as needed. The overflow treatment bay 18 shown utilizes a suitable stormwater filter cartridge 42, such as the StormFilter product available from Contech Stormwater Solutions, Inc. of West Chester, Ohio, and described in U.S. Pat. No. 7,214,311. Other possible cartridges that could be used include the Perk Filter available from Kristar Enterprises Inc. of Santa Rosa, Calif. or the CDS or MFS filtration cartridges also available from Contech Stormwater Solutions, Inc. It is also recognized that the overflow treatment bay 18 could utilize other forms of stormwater filtration devices, including non-cartridge type devices. Upflow type filters could also be used. In certain embodiments, the filtration means of the overflow treatment bay is readily replaceable, as is the case with the cartridge-type filters.

Preferably, the treatment capacity of the overflow bay is substantially greater than the treatment capacity of the filtration bed bay. For example, the treatment capacity of bay 18 may be at least two times greater than the treatment capacity of bay 16, and more preferably at least two and a half time greater (e.g., three, four or six times greater). In order to accomplish such a result, it is beneficial for the overflow treatment bay to utilize a different type of filtration device (e.g., self-contained filtration units in the form of cartridges) than the filtration bed of bay 16. In one example, the filtration bed bay may be configured to have a treatment flow capacity of between about 12 and 20 gallons per minute, and the overflow treatment bay may be configured to have a treatment flow capacity of between about 40 and 50 gallons per minute.

As shown, the filtration system 10 is of a size and structure suitable for placement in an urban environment, such as along a street or parking area to receive surface runoff or next to a building to receive the roof runoff. The vault prevents accumulated stormwater from destructively interfering with adjacent urban systems, and the generally self-contained configuration allows for easy placement as part of existing stormwater drainage solutions. The filtration system may be modified in configuration, structure, or size to accommodate the specific stormwater treatment needs of a target area without deviating from the invention as described and claimed herein.

Referring again to FIGS. 1A and 2A, water flows into the primary treatment bay via a curb inlet opening 29 and onto a band of rip-rap 28 to reduce water speed and erosion. In one embodiment, the tree is planted within a multi-layer bed 30 in the treatment bay. A top layer 32 of the bed may be 12 to 24 inches of a 60% (by volume) CSF leaf media or variant—40% (by volume) sand mix. The CSF leaf media component is made exclusively of composted, fallen deciduous leaves in granulated form, and is available from Contech Stormwater Solutions, Inc., of West Chester, Ohio. A next layer 34 of the bed may be 6 to 18 inches of sand. A bottom layer 36 may be 6 to 10 inches, or more, of gravel, which contains and covers a perforated pipe or pipe system 38 that collects water that has filtered through the bed.

In another embodiment only two layers are provided. For example, an upper layer formed by a media mixture consisting essentially of 18-33% (e.g., 25%) by volume of pelletized leaf compost (e.g., CSF), 50-65% (e.g., 57%) by volume pelletized pumice, 10-25% (e.g., 18%) by volume sand and less than 1% by volume water absorbent crystal material. The upper layer may be, for example, 25 to 35 inches deep (e.g., 28" deep). The upper layer may sit upon a lower gravel layer that is, for example, 4 to 8 inches deep (e.g., 6" deep).

Other variations in the make-up of the bed 30 are possible and contemplated, including beds with more or fewer layers, beds of uniform composition throughout their depth, and beds that utilize other materials.

The pipe system 38 includes an outlet segment 39 that runs through the dividing wall 14 into the secondary treatment bay 18 and joins with the outlet conduit 40, at a downstream side of the cartridges 42, for subsequent flow to the outlet of the vault. An outlet control valve 41 is positioned to control flow through the primary treatment bay to a desired flow rate according to applicable regulatory requirements. An outlet control orifice could be used in place of the valve 41, with the orifice sized to limit flow. Where a valve is used, the valve could be made as a one way valve that prevents reverse flow from the secondary treatment bay to the primary treatment bay. The valve or orifice 41 is located on the secondary treatment bay side but could readily be located on the primary treatment bay side. The pipe system 38 also includes one or more cleanouts 43 that extend upward above the top of the bed for accessibility. The cleanout access could alternatively be located on the secondary treatment bay side of the system. The valve or orifice feature could also be incorporated into systems that include only a primary treatment bay, without any secondary treatment bay.

The dividing wall 14 is formed to include an secondary path 44 to the secondary treatment bay. The secondary path may be a pathway at or near the top of the wall. The pathway may include an inclined screen 46 (e.g., made of stainless steel with aperture size of about 5 mm). Excessive flows into the primary treatment bay (i.e., flows that exceed the treatment capacity of the primary treatment bay) will result in an overflow into the secondary bay 18, where the overflow stormwater moves through one or more filter cartridges 42 for treatment. The water treated by the cartridges 42 meets the water treated by the primary treatment bay 16 downstream from both treatment means for mutual outflow. A bypass weir 48 is located in the secondary treatment bay 18 such that flows into the secondary treatment bay 18 in excess of the flow capacity of the filter cartridges 42 will pass directly to an outlet bay 49 and then to the vault outlet 51. In the illustrated embodiment the outlet conduit 40 delivers the treated water to the outlet bay 49.

Figure 1B:
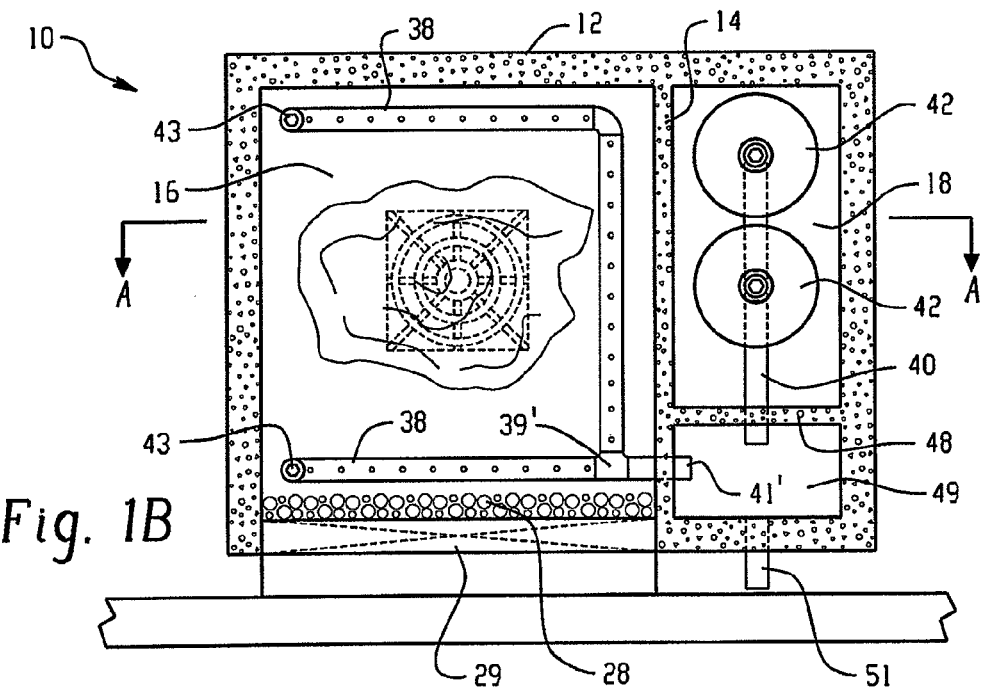
FIG. 1B shows another embodiment of a treatment system from above.
Figure 2B:
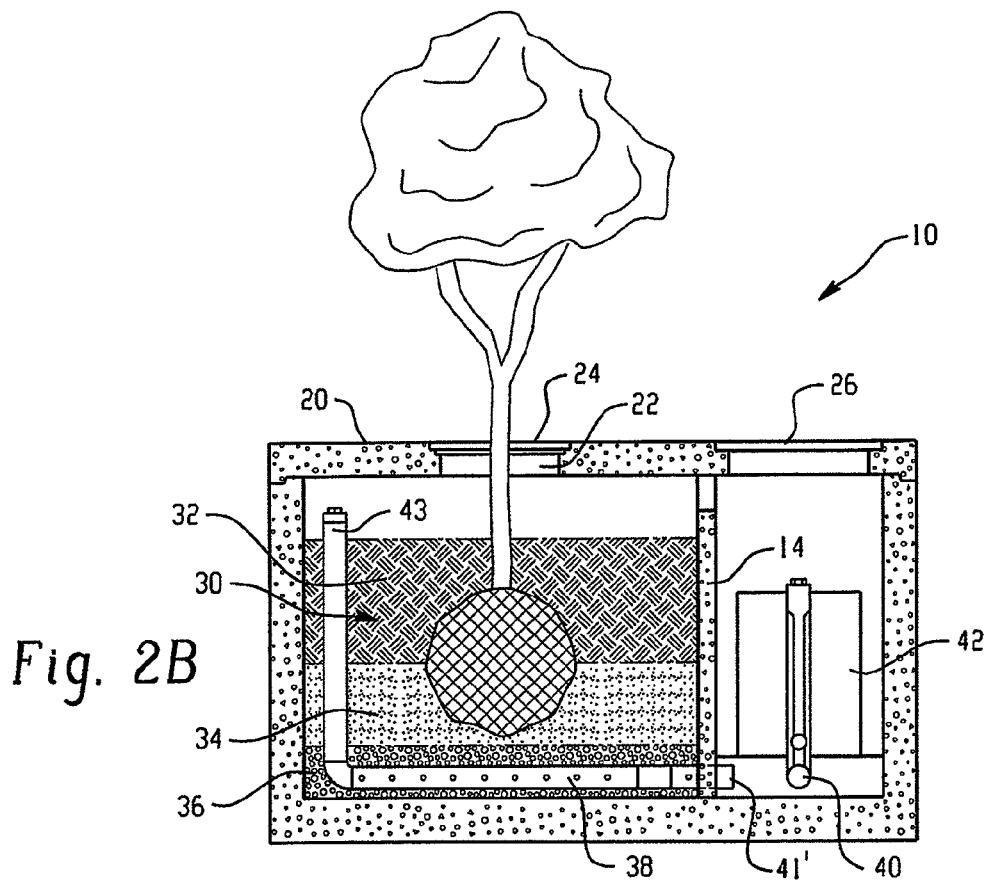
FIG. 2B is a side elevation view of the system of FIG. 1B.

FIGS. 1B and 2B depict an alternate embodiment of a stormwater filtration system in which the outlet segment 39' of the perforate pipe system extends through wall 14 and delivers water directly into the outlet bay 49 for subsequent flow through outlet 51. A flow control orifice 41' is sized to act as a limit on flow rate through the bed of the primary chamber 16 (e.g., to a level below the initial infiltration capacity of the bed). The outlet conduit 40 passes through the weir wall 48 to deliver filtered water from the cartridges into the outlet bay 49 for subsequent flow through outlet 51.

Figure 3:
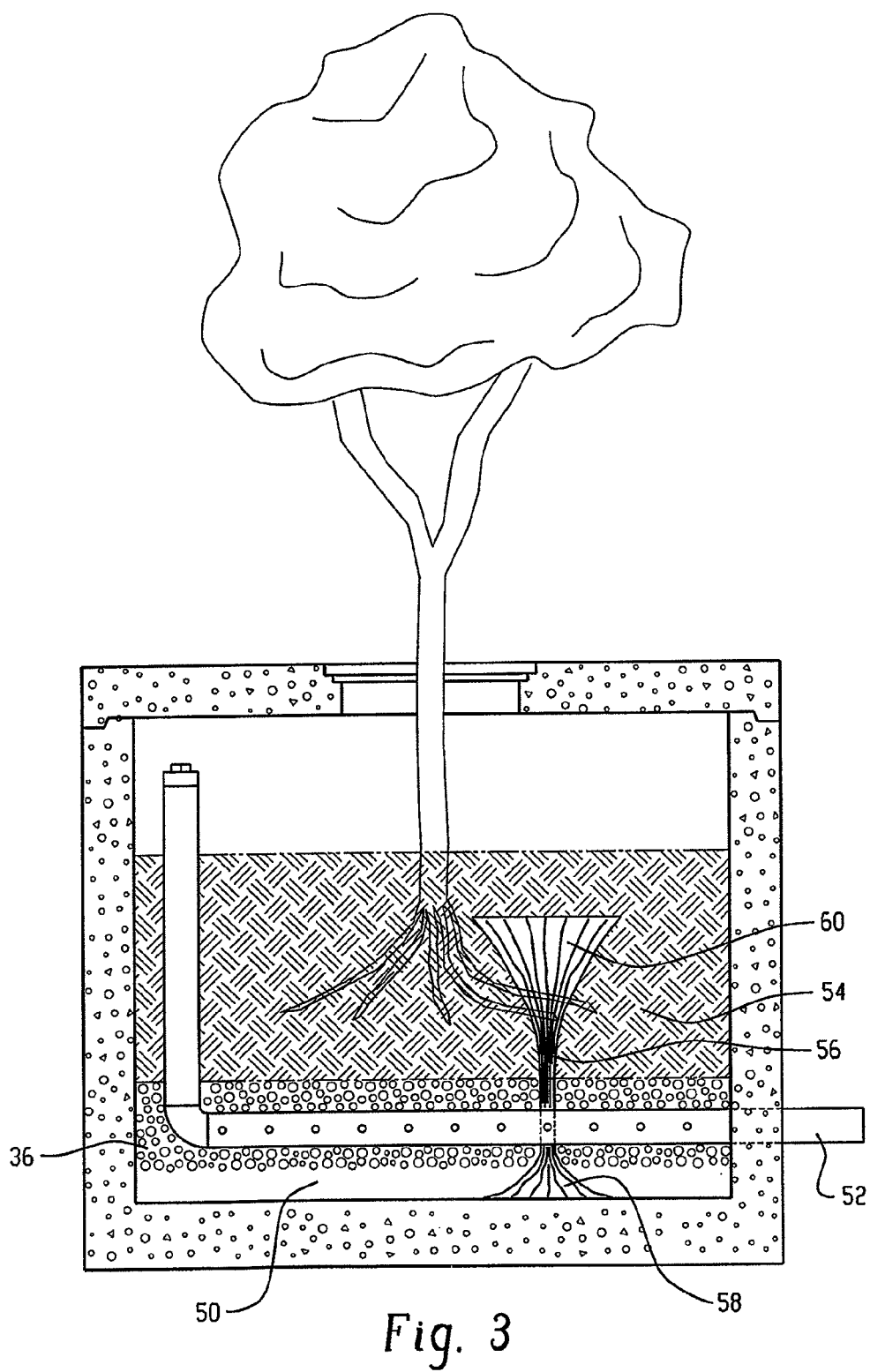
FIG. 3 is a side elevation view of the a treatment bay including a reservoir.

Referring now to FIG. 3, in connection with a stormwater filtration system that utilizes live plant material such as a tree, an advantageous feature may be provided in the form of a lower water reservoir 50 (e.g., below the outlet of the treatment bay) that is, in certain embodiments, either within a layer of open rock material or separated from the bay by a frame and fabric. Other structures for forming the reservoir could be provided. The bay outlet 52 is located above the reservoir 50 to assure that the reservoir is not drained as a result of the outlet path 52. Instead, stormwater that enters the unit filters through the bed 54 and some amount will collect in the reservoir 50. In one implementation, a venting pipe (not shown) may extend upward from the reservoir 50 in order to reduce the likelihood of anaerobic conditions occurring in the reservoir if the filtration bed becomes occluded.

During drier conditions, the bed 54 containing the live plant material may not receive sufficient water to maintain the live plant material. However, the reservoir can be used to maintain the plant material by providing a wick-type structure 56 with a lower end 58 positioned in the reservoir to absorb water and an upper end 60 positioned in proximity to the root material. In one embodiment, the wick-type structure could be as simple as a rope material with upper and lower ends being frayed. Capillary action of the wick-type structure draws water from the reservoir into the bed as the bed dries out. Alternatively, an active transport system such as a fluid pump or other irrigation feature may be used in place of the wick-type structure. In some cases, the configuration of the soil and live plant material may allow access to the water without the need for any additional structure. For arid and semi-arid regions, native plants or dry tolerant plants should be considered.

This reservoir feature could be combined with the two bay system of FIGS. 1 and 2 or any other embodiment described herein, in which case the perforated pipe system 38 should be located above the reservoir 50. The size and depth of the reservoir 50 could be configured to match with the anticipated duration of dry periods of the installation location and/or the water needs of the particular live plant material that is used.

It is recognized that instead of, or in addition to the tree, other live plant material could be used, including grasses and shrubs. The opening 22 and associated tree ring 24 may be replaced by another opening and configuration suitable for the live plant material used. Another option would be to provide the primary treatment bay without any live plant material. For example, a rock surface could overlay the filter bed, particularly where irrigation is unavailable or undesirable. This plant free embodiment could still utilize a water reservoir and wicking apparatus to reduce runoff volumes and encourage biotic activity in the soil.

Referring now to FIGS. 4A-4D, an additional feature that can be provided in such stormwater filtration systems is a root tray structure. Specifically, a tray or trays 80, which may be formed of plastic, may be provided for holding plant material at a top portion of a treatment bay. The trays may be formed and located to provide a passage 82 for a tree trunk as shown. Alternatively, other passages may be built into the tray structures to accommodate larger plants such as trees or shrubs that are used in the filtration bed. The trays may be formed with an internal grid structure 84 to provide structural integrity. The bottoms of the tray include openings to allow water to pass downward to the main bed 86 and to allow root growth into the main bed 86. The trays may also be provided with lower water reservoirs 88 for dry conditions.

The root tray structure is filled with earthen material and may include plants with shallow roots or fibrous roots systems, such as grass or other ground cover. The trays 80 may be designed to accommodate smaller plants known to perform a particular function, such as filtration of specific contaminants, or to provide an additional aesthetic benefit, such as smaller flowering plants. The tray system is easily replaceable in the event that replacing the plant matter therein is desired, such as the failure of the plant material growing therein, or aesthetically-motivated seasonal alteration of the surface of the treatment bay.

Figure 4C:
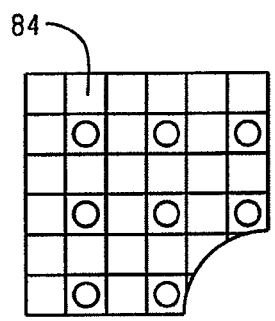
FIG. 4C is a top-down view of a root tray.
Figure 4A:
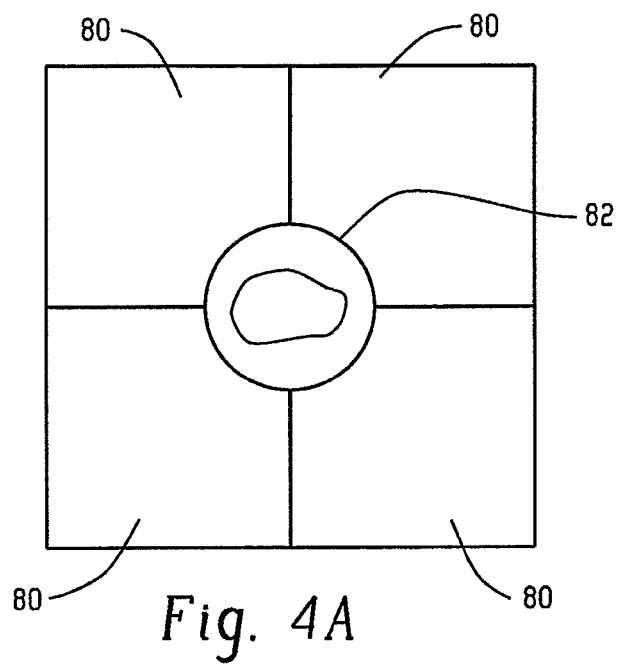
FIG. 4A shows a configured root tray system from above.
Figure 4D:
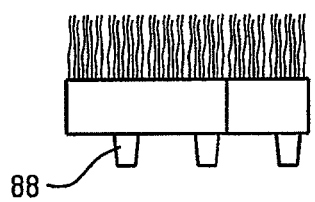
FIG. 4D is a side elevation view of a root tray system including reservoirs.
Figure 4B:
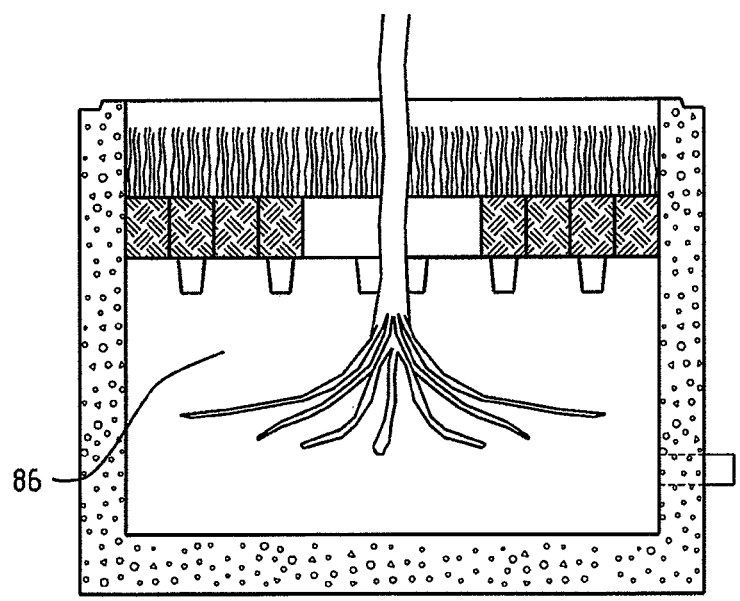
FIG. 4B is a side elevation view of a treatment bay including a root tray system.

Use of the root tray structure and associated plant matter for ground cover may motivate the use of a more open structure for a treatment bay than that illustrated in FIGS. 1-2. For example, as shown in FIG. 4B, the upper wall of the vault may be primarily or entirely absent to place the plants in open communication with the outside environment. The system can be configured to receive runoff through the top opening from sheet flow or at pointed locations after flow energy reduction via riprap.

Figure 6B:
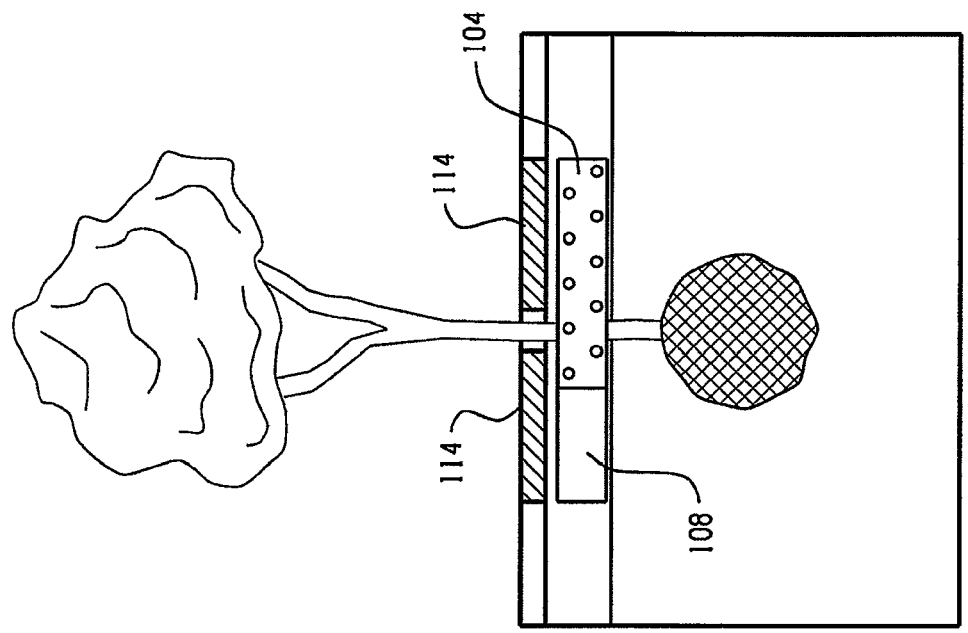
FIGS. 6A and 6B are views of an embodiment including a top pan.
Figure 6A:
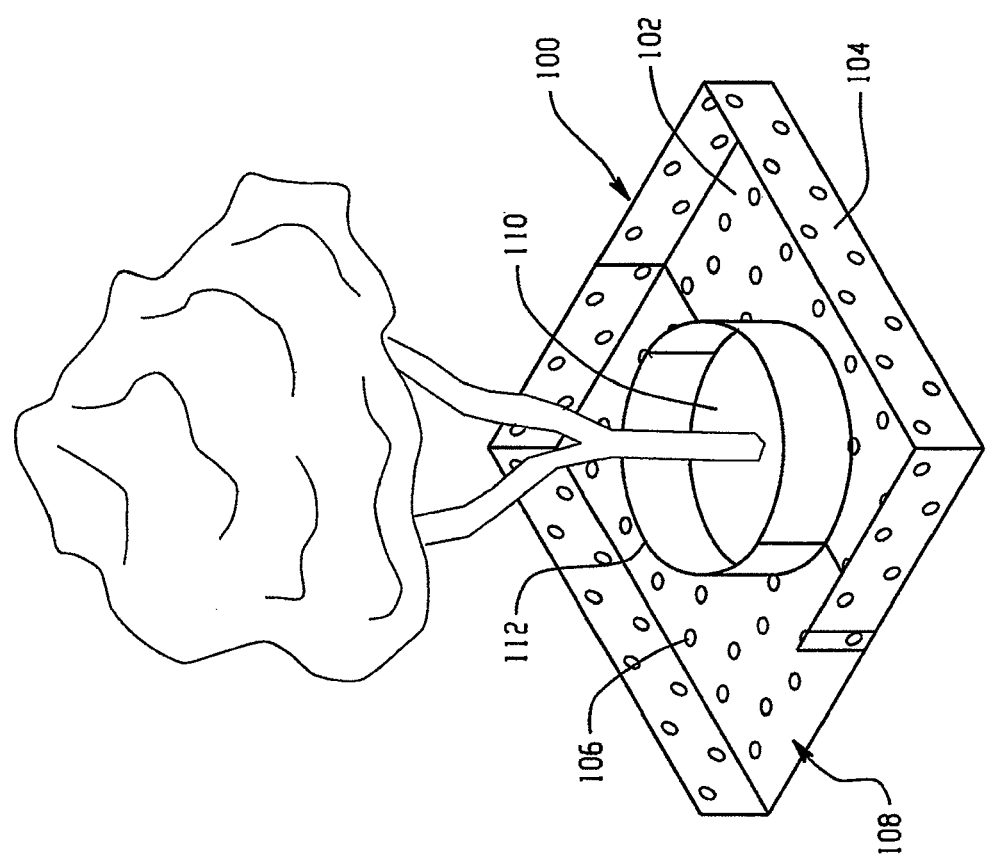

Referring to FIGS. 6A and 6B, a top pan concept is shown. Specifically, at the top of the filter bed a pan structure 100 could be used for erosion control. The pan structure 100 includes a base 102, upturned sidewalls 104 and plurality of openings 106 to permit water flow to the filtration bed. The pan structure may receive water directly from the curb inlet via a break or gap 108 in the upturned sidewall 104, or the pan structure may be placed alongside the rip rap. While shown as a single piece with the tree trunk extending upward through an opening 110 therein, the opening having an upturned sidewall 112, it is recognized that the pan structure could be formed of two or more pieces that meat at the tree trunk opening, so that the pan structure could be more readily removable. The tray may installed atop the filter bed, around the tree trunk and below the metal grates 114 that provides the opening for the tree. Where the pan footprint is substantially the same as that of the metal grate 114, removal of the pan may be more readily achieved by removal of the grate, and access to the pan for cleaning is also facilitated. However, variations are possible. How much surface area of the bed is covered by the pan may depend on how large the grates are. Large rectangular grates could allow the entire bed to be covered (if desired). The pan could also be manufactured with different tree/plant openings. For example, one centered opening for a tree is shown, patterns of multiple openings for smaller plants could be provided.

Figure 5A:
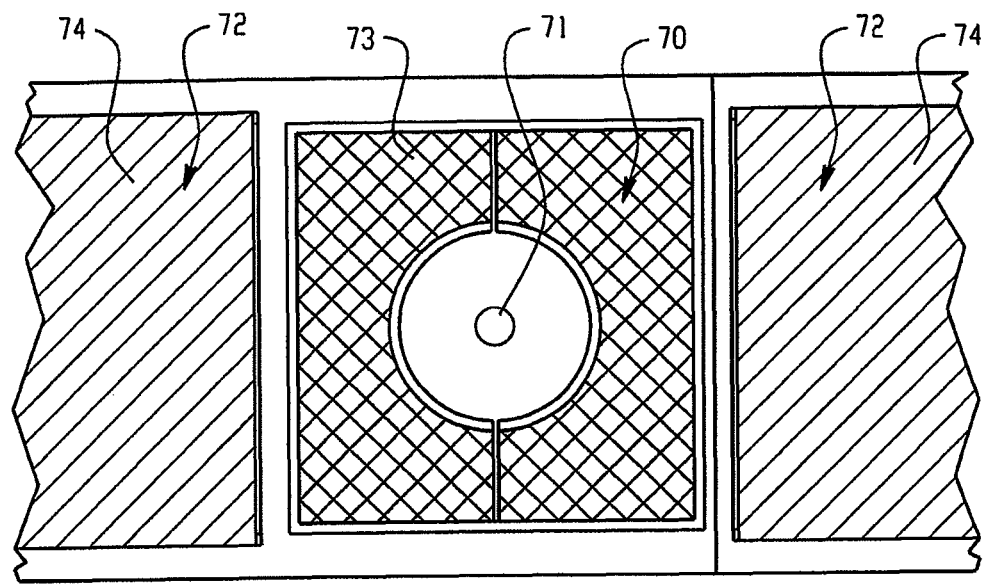
FIG. 5A is a top-down view of a filtration system including secondary vaults or bays with porous pavers.
Figure 5B:
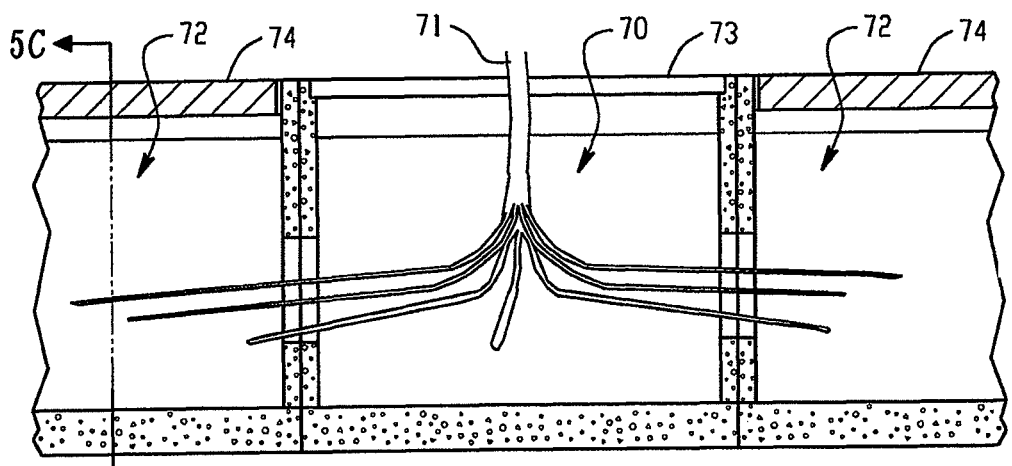
FIG. 5B is a side elevation view of the filtration system of FIG. 5A.
Figure 5C:
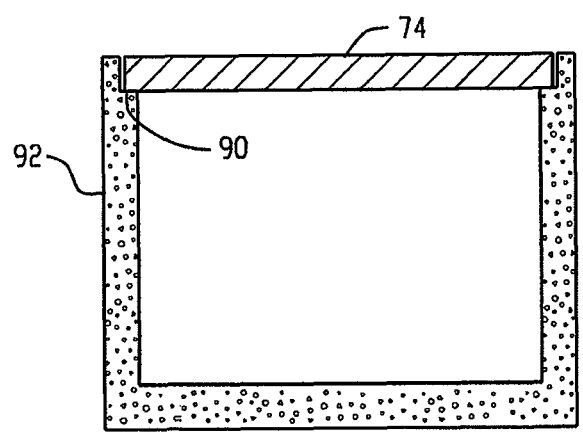
FIG. 5C is a side elevation view orthogonal to FIG. 5B along line A-A.

In another aspect, a stormwater filtration system including live plant material may involve multiple vault chambers, or a larger vault with multiple bays, designed to extend over a larger area or footprint. In some implementations these additional vault chambers or bays may be configured to accommodate extended root structures. As shown in FIGS. 5A-C, primary vault chamber or bay 70 includes a tree 71 implanted in the filter bed therein. The tree is accommodated by a tree ring 73 and grate structure that cover the bay. Adjacent to the primary treatment bay 70 are multiple secondary vault chambers or bays 72 designed to accommodate the extended root system of the tree and provide additional filtration over a wider area.

The secondary vault chambers or bays 72 may be covered by a porous pavement material 74 which allows stormwater to enter. In one embodiment, interlocking concrete pavers can be used. The porous pavement material can be formed into a sidewalk or other surface appropriate for human use in an urban environment. The secondary vault chambers or bays 72 may initially contain little or no root structure when a young tree is installed, but may be built to accommodate the tree's root structure as it matures (e.g., the vault wall or walls separating the bay 70 from respective bays 72 may include openings therethrough to allow passage of the roots). To better accommodate root growth, the secondary vault chambers 72 may include a gap between the porous pavers and the surface of the soil, so that root expansion is unlikely to damage or displace the pavers. The pavers can be supported on inner ledges 90 formed by the walls 92 of the vault so as to provide required structural reliability while maintaining the gap. The porous pavers may be removable for easy maintenance or replacement of the porous pavement material, or to allow for removal or replacement of the filtration bed or the tree therein.

Depending on the nature of the filtration system, the walls separating the primary and secondary vault chambers may include openings to accommodate the root system, or may be partially or entirely absent. The vault chambers may be part of a tandem structure or may be distinct and modular in construction. In one embodiment, the same shape and material is used for each vault chamber, both primary and secondary, with differing top wall coverings to accommodate the differing live plant matter in the filtration beds. In another embodiment, the primary vault chamber may be structurally distinct from the secondary vault chamber.

Any of the structures disclosed above may be included in the primary and secondary vault chambers shown here, including the inlet and outflow means, the secondary treatment bay, the reservoir and wick system, and the root tray system. The filtration beds may be of similar composition or may differ between the primary and secondary vault chambers. A variety of perforated pipe configurations may connect the chambers.

Figure 7A:
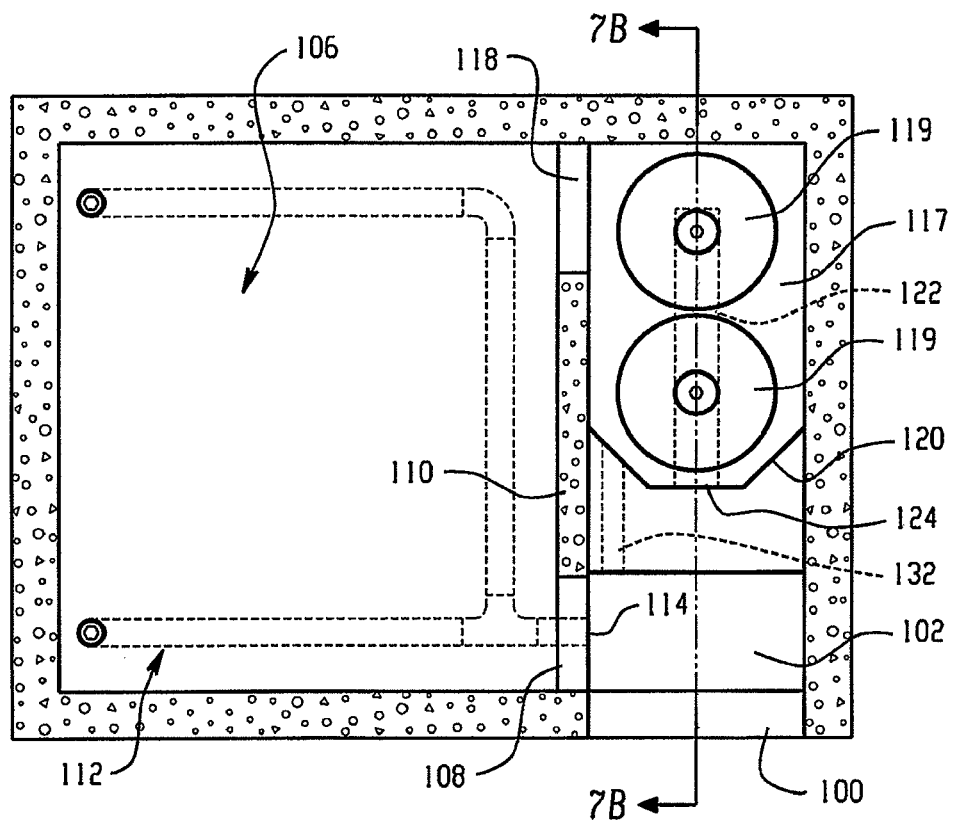
FIGS. 7A-7B illustrate a further embodiment of a treatment system.
Figure 7B:
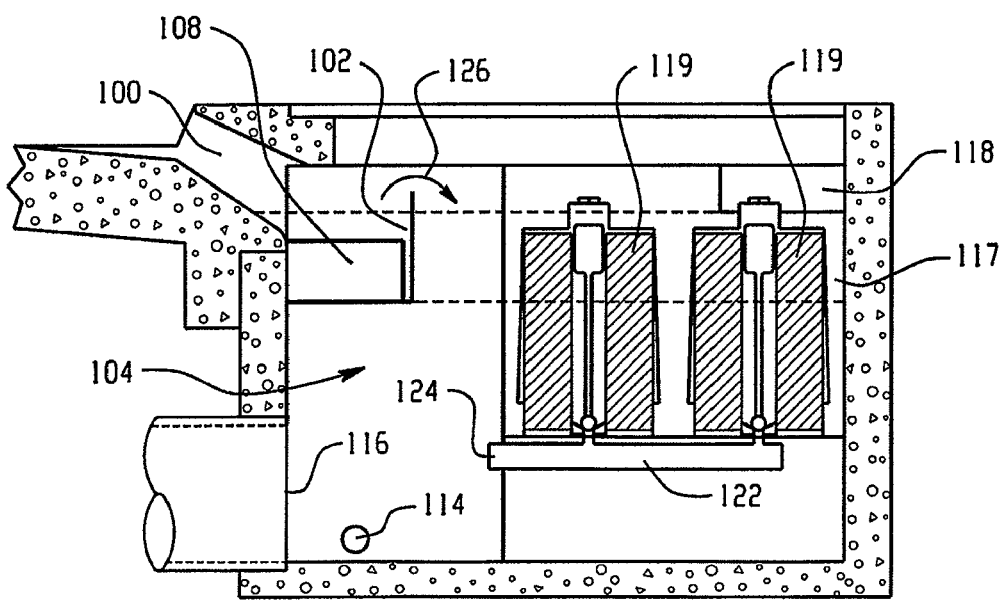

Referring to FIGS. 7A-7B, another embodiment is shown in which stormwater enters the vault unit through an inlet opening 100 into an inlet tray or compartment 102 above the outlet in the outlet bay 104. The water leaves the tray and flows laterally into the primary treatment bay 106 via opening 108 in wall 110. Water traveling downward through the primary treatment bay bed enters a pipe system 112 and is directed into the outlet bay 104 though primary bay outlet 114. Once in the outlet bay water can exit the unit via outlet opening 116. Water that enters the primary treatment bay in excess of its treatment capacity rises and spills into the secondary treatment bay 117 via overflow opening 118 to pass to the filter cartridges 119. The secondary treatment bay is sealed from the outlet bay by a metal (or other) wall 120, except that water passing through the filters enters a pipe 122 and then flows to the secondary bay outlet 124, which flows into the outlet bay 104. If the water inflow to the unit exceeds the combined capacity of both the primary treatment bay and the secondary treatment bay, the water will rise higher in the primary treatment and cause the water level in the inlet tray 102 to rise. The inlet tray 102 is configured with an overflow path 126 directly into the lower portion of the outlet bay 104, and water can flow over a top of the tray directly into the outlet bay for exiting the unit without passing through either the primary treatment bay or the secondary treatment bay. The lower edge of the overflow path 126 is above the lower edge of the overflow opening 118 in the wall 110.

In one example, the inlet tray or compartment 102 may be formed as a metal tray structure mounted to the wall of the vault. The floor component 130 may be removable such that, during installation, and prior to completion of the unit, the floor component may be left out of the unit such that stormwater entering the inlet compartment proceeds directly down to the outlet 116 of the outlet bay 104 without entering the primary treatment bay 106. Once the unit is ready it can be brought online by installing the floor structure.

In an alternative arrangement, the unit shown in FIGS. 7A and 7B could be modified such that the overflow opening 118 in the wall 110 is eliminated (i.e., no direct overflow path from bay 106 to bay 117) and an overflow path 132 directly from the inlet compartment 102 to the bay 117 is provided. In such an arrangement, the incoming water in excess of the primary treatment bay flow capacity would not enter the primary treatment bay in order to travel to the secondary treatment bay.

Figure 8:
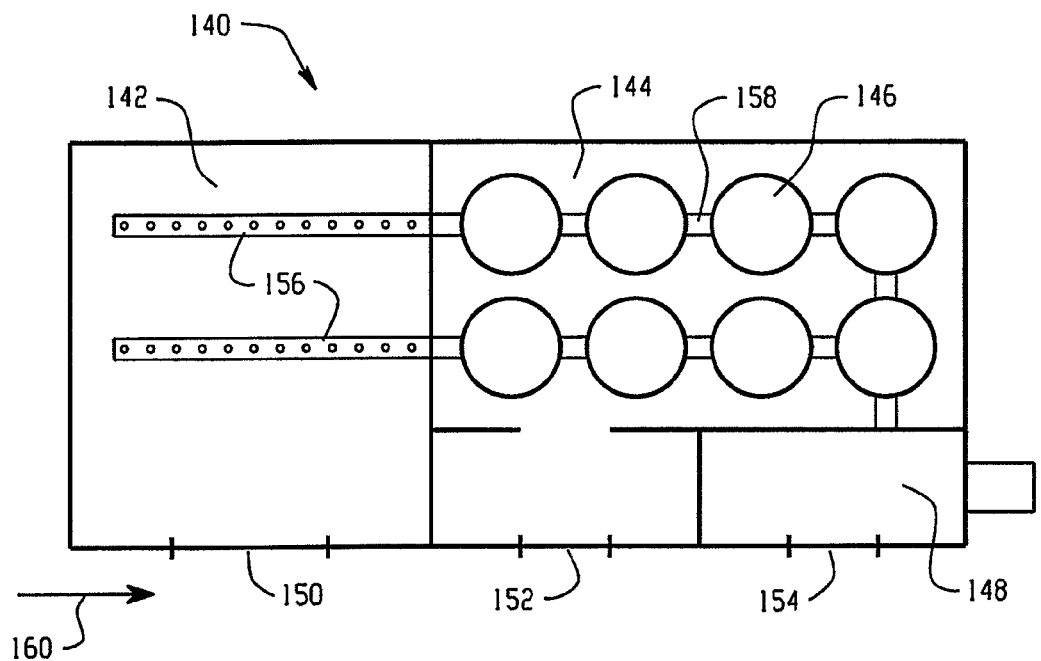
FIG. 8 is a schematic depiction of an embodiment of a treatment system including separate inputs for the primary, secondary and outlet bays.

Referring to the schematic of FIG. 8, in another alternative embodiment a system 140 includes a primary treatment bay 142 with an associated filtration bed and live plant material, a secondary treatment bay 144 with filter cartridges 146 and an outlet bay 148. A first vault inlet 150 leads directly into the primary bay 142, a second vault inlet 152 leads into the secondary bay 144 and a third vault inlet 154 leads directly into the outlet bay 148. The outlet piping system 156 of the primary bay 142 connects to the piping 158 that receives filtered stormwater from the cartridges 146 and flows into the outlet bay 148. This arrangement eliminates the overflow paths within the vault, and instead uses a flow control defined by the three openings so that flow in flow direction 160 excess of the primary bay capacity will move downstream to second inlet 152, and flow in excess of the combined capacity of the primary bay 142 and secondary bay 144 will move downstream to third inlet 154.

Figure 9:
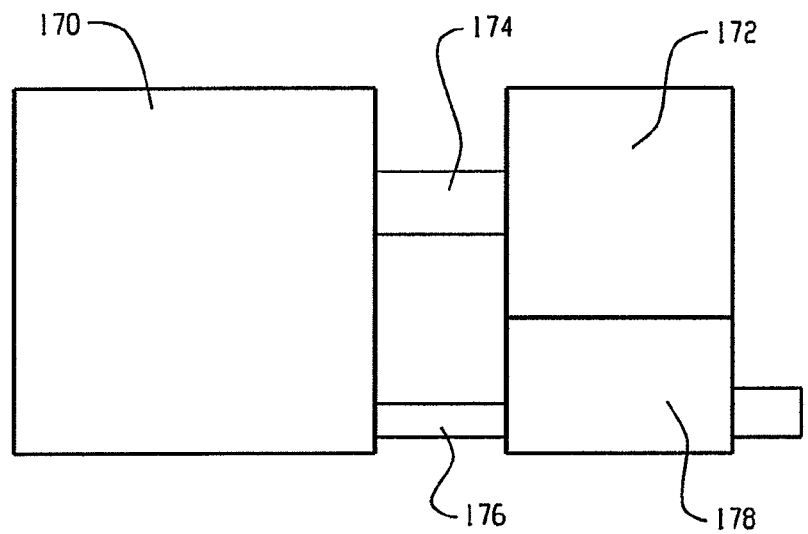
FIG. 9 is a schematic depiction of a treatment system using distinct vault structures.

The schematic of FIG. 9 is illustrative of a system in which the primary treatment bay 170 and secondary treatment bay 172 are formed by separate vault structures that are interconnected by piping 174 for overflow to the secondary bay 172 and piping 176 for delivering bed filtered water to an outlet bay 178.

It is to be clearly understood that the above description is intended by way of illustration and example only and is not intended to be taken by way of limitation. For example, another advantageous feature would be to stratify the plant root zones to accommodate a deeper and more complex root zone to promote infiltration, nutrient uptake and plant transpiration. In addition, use of different plant species to create the root zone stratification can also be used to manage the filter bed surface to reduce clogging with complex stem structures which by mechanisms of shrinking, swelling, mechanical movement by wind, new growth and senescence promotes continuously open pores and openings in the soil surface. Moreover, while the primary embodiment shown and described above include a vault structure in which the primary treatment bay includes a solid bottom wall, it is recognized that the solid bottom wall could be made porous, or with one or more openings, or even eliminated in applications where it would be desirable to have some treated water infiltrate into the ground below the device. The outlet bay could similarly be formed to allow such infiltration. Other variations are possible.

What is claimed is:
1. A stormwater filtration system, comprising:
 a first treatment bay including a filtration bed, an inlet for receiving stormwater and an outlet for passing bed filtered stormwater from the first treatment bay; and
 a second treatment bay including at least one stormwater filtration device, an inlet for receiving stormwater and an outlet for passing filtration device filtered stormwater from the second treatment bay;
 a water flow system configured to direct stormwater such that at least some stormwater of a stormwater flow enters the inlet of the first treatment bay for filtration through the filtration bed, and when a flow rate of the stormwater flow exceeds a first treatment bay flow capacity at least some stormwater flow enters the inlet of the second treatment bay for filtration through the filtration device without passing through the filtration bed of the first treatment bay;
 wherein live plant matter is planted within the filtration bed and is exposed through an upper opening of the first treatment bay.

2. The stormwater filtration system of claim 1 wherein a second treatment bay flow capacity is at least two times greater than the first treatment bay flow capacity.

3. The stormwater filtration system of claim 2 wherein the second treatment bay flow capacity is at least three times greater than the first treatment bay flow capacity.

4. The stormwater filtration system of claim 2 wherein the stormwater filtration device of the second treatment bay comprises a self-contained stormwater filtration cartridge mounted within the second treatment bay, the second treatment bay including an upper access port enabling removal and replacement of the stormwater filtration cartridge.

5. The stormwater filtration system of claim 3 wherein:
the vault includes a main inlet located in an upper portion of the outlet bay, the main inlet feeds a inlet compartment of the outlet bay, the inlet compartment connected to the first treatment bay by the inlet of the first treatment bay for delivering stormwater to the first treatment bay, the inlet compartment further including an overflow outlet directly to the outlet bay,
when flow rate into the inlet compartment exceeds the combination of the first treatment bay flow capacity and a second treatment bay flow capacity, at least some stormwater flow passes from the inlet compartment via the overflow outlet into the outlet bay without passing into the first treatment bay or the second treatment bay.

6. The stormwater filtration system of claim 5 wherein the outlet of the second treatment bay is higher than a floor of the outlet bay, the stormwater filtration device of the second treatment bay is above the outlet of the second treatment bay.

7. The stormwater filtration system of claim 5 wherein the inlet compartment includes a removable floor structure.

8. The stormwater filtration system of claim 5, wherein the at least one stormwater filtration device of the second treatment bay comprises a stormwater filtration cartridge.

9. The stormwater filtration system of claim 1, further comprising
a vault that forms the first treatment bay and second treatment bay, the vault including a wall that separates the first treatment bay and second treatment bay, at least one opening in the wall and above the filtration bed for passing water from the first treatment bay to the second treatment bay when water level in the first treatment bay rises to the level of the opening, the opening acting as the inlet of the second treatment bay.

10. The stormwater filtration system of claim 9, wherein:
the vault includes an outlet bay having an outlet for permitting stormwater to exit the vault, the outlet bay connected to receive filtration device filtered stormwater from the outlet of the second treatment bay; and
the outlet of the first treatment bay comprises a pipe that runs from a lower portion of the first treatment bay through the wall for carrying bed filtered stormwater treated by the first treatment bay to the outlet bay.

11. The stormwater filtration system of claim 9, wherein:
the vault includes an outlet bay having an outlet for permitting stormwater to exit the vault, the second treatment bay including a pipe extending from the stormwater filtration device to the outlet of the second treatment bay, the outlet of the second treatment bay feeding into the outlet bay; and
the outlet of the first treatment bay comprises a pipe that runs from a lower portion of the first treatment bay through the wall and joins with the pipe of the second treatment bay.

12. The stormwater filtration system of claim 9, wherein a screen is positioned proximate the wall opening so that overflow treatment water passes through the screen to enter the second treatment bay.

13. The stormwater filtration system of claim 9 further comprising a reservoir located below the level of the outlet of the first treatment bay, wherein some filtered stormwater is stored in the reservoir, the stored water accommodating needs of the live plant matter in the filtration bed during periods where stormwater received by the first treatment bay is insufficient for the live plant matter.

14. The stormwater filtration system of claim 13 further comprising a wicking structure which transports water from the reservoir into the filtration bed by capillary action as the filtration bed dries out.

15. The stormwater filtration system of claim 1 wherein the first treatment bay flow capacity is defined by a mechanical flow restrictor other than the filtration bed.

16. The stormwater filtration system of claim 1, further comprising
a vault that forms the first treatment bay and second treatment bay, the vault including a wall that separates the first treatment bay and second treatment bay, the vault having a main inlet to an inlet compartment, the inlet compartment connected to deliver at least some incoming stormwater flow to the inlet of the first treatment bay, and the inlet compartment connected to deliver at least some stormwater flow to the inlet of the second treatment bay, without passing into the first treatment bay, when the flow rate of the stormwater flow exceeds the first treatment bay flow capacity.

17. The stormwater filtration system of claim 1, further comprising:
a first vault forming the first treatment bay,
a second vault forming the second treatment bay,
and an overflow path from the first vault to the second vault.

18. The stormwater filtration system of claim 1, further comprising:
a vault that forms the first treatment bay, the second treatment bay and an outlet bay,
the inlet of the first treatment bay is formed by a first vault inlet directly into the first treatment bay, the outlet of the first treatment bay connected with a flow path that leads to the outlet bay;
the inlet of the second treatment bay is formed by a second vault inlet for delivering stormwater into the second treatment bay without entering the first treatment bay, the outlet of the second treatment bay connected to the outlet bay;
a third vault input located for delivering stormwater into the outlet bay without entering either the first treatment bay or the second treatment bay;
the third vault inlet downstream of the second vault inlet along a stormwater flow path to the vault, the second vault inlet downstream of the first vault inlet along the stormwater flow path to the vault.

19. The filtration system of claim 1 wherein the outlet of the first treatment bay includes a perforated pipe toward the bottom of the treatment bay, the pipe including:
at least one cleanout which runs from the surface of the first treatment bay filtration bed to the lower portion of the first treatment bay to provide access to the pipe therein, and
a valve or orifice that acts to control flow of water through the first treatment bay.

20. The stormwater filtration system of claim 1, wherein the first treatment bay includes a tree planted in the filtration bed and extending upward through the upper opening of the first treatment bay.

21. The stormwater filtration system of claim 1, wherein the filtration bed of the first treatment bay comprises a media mixture including pelletized leaf compost, pelletized pumice, and sand.

22. The stormwater filtration system of claim 21 wherein the media mixture comprises 18-33% by volume of pelletized leaf compost, 50-65% by volume pelletized pumice, and 10-25% by volume sand.

23. The stormwater filtration system of claim 21 wherein the filtration bed includes a layer of gravel beneath the media mixture, a perforated pipe within the gravel layer and extending to the outlet of the first treatment bay.

24. The stormwater filtration system of claim 1, the first treatment bay further including
a root tray system including removable trays containing earthen material and live plants appropriate as ground cover, the trays placed above the filtration bed and configured to allow stormwater to pass through the earthen material and into the filtration bed.

25. A stormwater filtration system, comprising:
a vault including a first treatment bay with a filtration bed containing live plant matter and an outlet bay for delivering stormwater out of the vault, the vault including a main inlet to a raised inlet compartment within the outlet bay, the inlet compartment connected to deliver stormwater at least to the first treatment bay and including an overflow into the lower part of the outlet bay, the lower part of the outlet bay including a vault outlet.

26. The stormwater filtration system of claim 25 wherein the inlet compartment includes a removable floor structure, in the absence of the floor structure stormwater entering the inlet compartment proceeds directly to the outlet of the outlet bay without entering the first treatment bay.

27. The stormwater filtration system of claim 25 including a second treatment bay, the inlet compartment connected to deliver at least some stormwater flow to the second treatment bay, without passing into the first treatment bay, when the flow rate of the stormwater flow exceeds a first treatment bay flow capacity.

28. The stormwater filtration device of claim 25 wherein a flow capacity through the filtration bed is restricted by a valve or orifice associated with an outflow system of the first treatment bay.

29. The stormwater filtration system of claim 25, wherein: the first treatment bay includes an outlet comprising a perforated pipe for carrying bed filtered stormwater to the outlet bay, the perforated pipe runs along a lower portion of the first treatment bay to a lower opening in an internal wall of the vault that separates the first treatment bay and the outlet bay, and the internal wall of the vault further includes an upper opening for permitting water to flow from the inlet compartment into the first treatment bay.

30. The stormwater filtration system of claim 29, wherein: the inlet compartment comprises a tray structure mounted within the vault.

31. The stormwater filtration system of claim 29, wherein: the overflow passes over a raised wall of the inlet compartment.

32. The stormwater filtration system of claim 29, wherein: the main inlet comprises a curb inlet that is offset laterally from the first treatment bay.

33. The stormwater filtration system of claim 25, wherein: the inlet compartment comprises a tray structure mounted within the vault.

34. The stormwater filtration system of claim 25, wherein: the overflow passes over a raised wall of the inlet compartment.

35. The stormwater filtration system of claim 34, wherein: the main inlet comprises a curb inlet that is offset laterally from the first treatment bay.

36. A method for treating stormwater, the method comprising the steps of:
receiving stormwater into a first treatment bay including a filtration bed having live plant material planted therein,
filtering some of the stormwater downward through the filtration bed;
directing at least some stormwater not filtered by the filtration bed into an second treatment bay located adjacent the first treatment bay, the second treatment bay including one or more stormwater filtration cartridges located therein;
filtering at least some stormwater that enters the second treatment bay by passing through the one or more stormwater filtration cartridges;
directing the stormwater filtered by the filtration bed and the stormwater filtered by the cartridges away from the first treatment bay and second treatment bay.

37. The method of claim 36, wherein the first treatment bay and second treatment bay are collectively formed by a vault, and wherein the step of directing the filtered stormwater away from the first treatment bay and second treatment bay includes directing the stormwater through an outlet that exits the vault.

38. The method of claim 37, wherein the step of directing the filtered stormwater away from the first treatment bay and second treatment bay further includes the step of directing the stormwater filtered by the first treatment bay into a perforated pipe located toward the bottom of the filtration bed, the perforated pipe entering the second treatment bay and connected to an outlet conduit downstream of the one or more stormwater filtration cartridges.

39. The method of claim 37, wherein the step of directing the filtered stormwater away from the first treatment bay and second treatment bay further includes the step of directing the stormwater filtered by the first treatment bay into a perforated pipe located toward the bottom of the filtration bed, the perforated pipe entering an outlet bay adjacent the outlet of the vault.

40. The method of claim 36, wherein the step of directing stormwater into the second treatment bay includes flowing stormwater over a passage formed by a wall separating the first treatment bay from the second treatment bay.

41. The method of claim 40 wherein the step of directing stormwater into the second treatment bay includes flowing stormwater through a screen associated with the passage.

42. A stormwater treatment system, comprising:
a vault including:
a treatment bay with a filtration bed containing live plant matter and an outlet bay for delivering stormwater out of the vault, the outlet bay including a vault outlet;
an internal wall separating the treatment bay and the outlet bay;
a curb inlet that is offset laterally from the first treatment bay and aligned with the outlet bay;
a raised inlet compartment over the outlet bay for receiving water from the curb inlet and directing water through an opening to the treatment bay, the inlet compartment including an overflow into the outlet bay for bypassing high flows to the outlet bay and through the vault outlet without passing through the treatment bay.

43. The stormwater treatment system of claim 42, wherein: the treatment bay includes an outlet comprising a perforated pipe for carrying bed filtered stormwater to the outlet bay, the perforated pipe runs along a lower portion of the treatment bay to a lower opening in the internal wall, and the opening to the treatment bay is formed in an upper part of the internal wall.

44. The stormwater treatment system of claim 43, wherein: the inlet compartment includes a raised wall, the overflow passes over the raised wall.

45. The stormwater treatment system of claim 44, wherein: the inlet compartment comprises a tray structure mounted in the vault.

46. A stormwater treatment system comprising a treatment vault having a treatment bay for receiving filter media and a outlet bay separated by a internal wall of the treatment vault, said internal wall defining a discharge opening between said treatment bay and said outlet bay, said outlet bay including an inlet opening for receiving stormwater to be treated, an inlet tray positioned within said outlet bay and in fluid communication between said inlet opening and said discharge opening, said inlet tray for receiving stormwater through the inlet opening, for discharging stormwater through said discharge opening into said treatment bay, and for enabling high stormwater flow directly into said outlet bay, said inlet tray including a tray floor having a tray inlet area positioned adjacent said inlet opening, a tray discharge area positioned adjacent said discharge opening, and a wall extending upwardly from said tray floor, wherein stormwater to be treated enters the inlet opening, falls onto the inlet tray and water to be treated flows out of the discharge opening into the treatment bay where it is filtered by the filter media, and wherein high flow rates bypass the treatment bay by overflowing the wall and into the outlet bay.

47. The stormwater treatment system of claim 46, wherein said treatment bay includes an underdrain pipe including openings to receive treated stormwater and extending through said internal wall in fluid communication with said outlet bay.

48. The stormwater treatment system of claim 47, wherein said outlet bay includes an outlet opening to enable treated and untreated stormwater to be discharged from the outlet bay.

49. The stormwater treatment system of claim 46, wherein said internal wall discharge opening and said outlet bay inlet opening are disposed substantially 90 degrees apart.

50. A stormwater treatment system comprising a treatment bay formed from side walls defining a bottom, at least a partially open top, and a internal wall having a internal wall discharge opening, a outlet bay formed from outlet bay side walls defining a bottom, at least a partially open top, and said internal wall, said outlet bay including an inlet opening for receiving stormwater to be treated, an inlet tray positioned within said outlet bay and including a tray inlet area in fluid communication with the outlet bay inlet opening, a tray discharge area in fluid communication with the internal wall discharge opening, and a upstanding tray wall to enable overflow fluid communication between the tray and the outlet bay, said treatment bay holding a filter media including a mixture of organic and non-organic material for treating stormwater that may pass through the filter media, an underdrain pipe located in proximity to said bottom of said treatment bay and exiting the treatment bay through an opening in the internal wall into the outlet bay, said underdrain pipe including perforations to receive treated stormwater.

* * * * *